Jan. 31, 1967 K. F. O'CONNOR 3,301,292
SONIC GRAIN HULLING APPARATUS AND METHOD
Filed Feb. 6, 1964
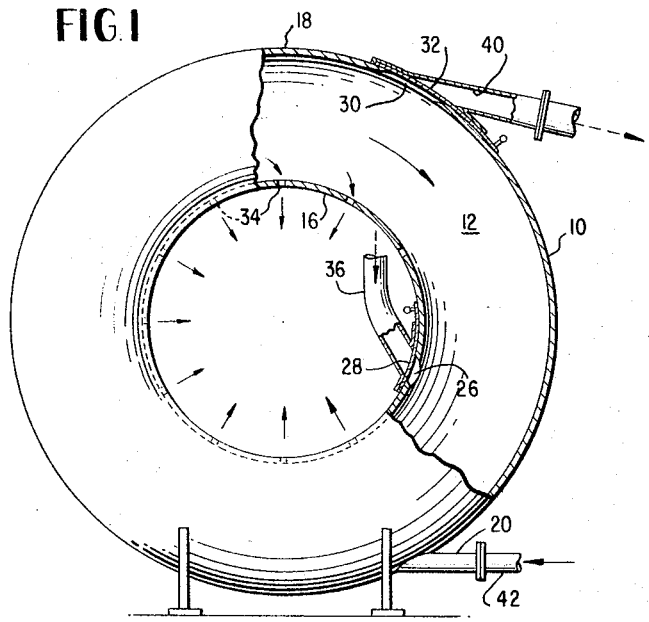
FIG.1
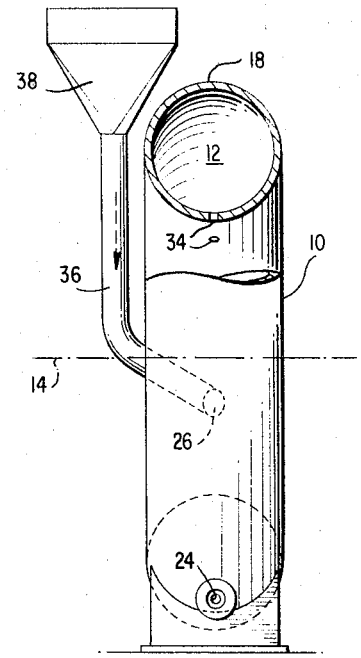
FIG.2
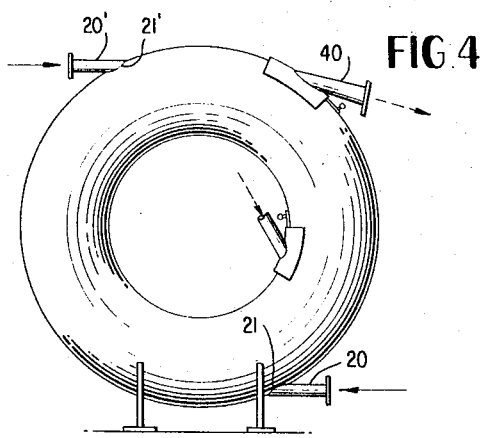
FIG.4
FIG.3
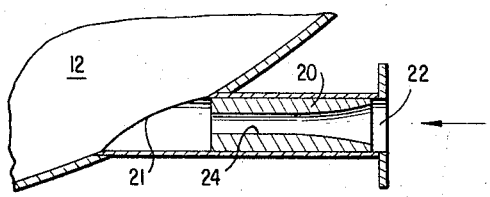
FIG.5
INVENTOR.
KENNETH F. O'CONNOR
BY
Izous, Buch, Swindler & McKie
ATTORNEYS United States Patent Office 3,301,292
Patented Jan. 31, 1967

3,301,292
SONIC GRAIN HULLING APPARATUS
AND METHOD
Kenneth F. O'Connor, Yonkers, N.Y., assignor, by mesne
assignments, to Food Engineering International, Inc.
Filed Feb. 6, 1964, Ser. No. 342,919
13 Claims. (Cl. 146—221.5)

This invention relates to an apparatus and method for hulling and debranning cereal grains by use of a high velocity air stream. More particularly, this invention relates to an apparatus and method for hulling and debranning cereal grains by a combination of agitation, air friction, and sonic vibrations, all induced by introducing a high velocity air stream at or near the speed of sound into a toroidal shaped chamber in which the grains to be hulled and debranned are placed.

It has heretofore been proposed to hull cereal grains by the action of a high velocity air current. Prior devices and methods employing this principle have, however, met with little practical success, since they usually failed to perform milling of a high enough quality to be competitive with conventional methods of milling that have been in use for many years.

Moreover, such prior devices and methods have been both time-consuming and expensive to operate and incapable of milling large or commercial amounts of grain with an efficiency comparable to that achieved by conventional methods of milling. One reason for this failure of the prior devices and methods is that they could only mill a small quantity of grains at one time and even these small quantities consumed excessive amounts of air and time.

Further, with many of the prior devices and methods the grains were subjected to the air stream only once, or to only one blast from the air stream, and thus did not receive the benefits of the repeated cyclic exposure to the air stream that is attained with the present invention. With other of the prior devices and methods, although there may have been more than one exposure of the grains to a high velocity air stream, the milling chambers were of a shape in which it is virtually impossible to achieve a steady air stream velocity at or near the speed of sound (Mach one), and accordingly the important benefits of inducing sonic vibrations on the surfaces of grains were unattainable.

No prior device or method has thus been capable of achieving the new and useful result of the present invention in which cereal grains are hulled and debranned by simultaneous exposure to the combined milling action of: (1) agitation (abrasion of the grains against each other and the walls of the chamber), (2) air friction (peeling forces induced by high velocity air coming into contact with the surfaces of slower moving grains), and (3) sonic vibrations (turbulence and vibrations set up on the surfaces of the grain by the formation of shock waves when air in contact with any point on the surfaces of the grains attains the speed of sound).

Finally, prior apparatuses and methods for air stream milling of cereal grains have resulted in excessive breakage of the grains, inadequate and incomplete hulling or debranning, and yields too low to be economically acceptable.

As opposed to the prior devices and methods, the apparatus and method of this invention permit maximum efficient use of the combined effects of agitation, air friction, and sonic vibrations in a milling chamber that has gradual smooth and continuous curves which permit beneficial milling action to freely take place but which avoid the deleterious impacts of the grains against the chamber or against each other that are characteristic of prior devices and methods and that lead to excessive breakage of grains and unacceptably low yields.

Although the present invention is beneficial and useful in milling various types of cereal grains, it is especially efficacious and advantageous for milling rice grains, and for debranning rice it is particularly useful, efficient, and superior to the prior art in debranning rice.

Rice as it comes from the field is commonly known as "paddy." Grains of rice paddy include an outer hull or protective husk over the rice grain proper. This outer hull or husk normally can be removed without great difficulty. Once the husk is removed, however, the rice grain remains surrounded by a tough, closely adherent and retentive bran coat or covering. Rice in this form is commonly called "brown rice." Most consumers, however, prefer white milled or polished rice in which the bran coat has been removed.

In creating the milled white rice of commerce, great difficulties have been encountered in the past in achieving successful and complete removal of the bran coat without breaking or otherwise destroying the integrity of the rice grain. Moreover, even when the bran coat is successfully removed by the methods and devices now in use in the rice milling industry, there is necessarily a wearing away of a good deal of the white endosperm or interior portion of the grain together with the bran coat.

This wearing away of the endosperm causes a significant loss in yield, and in recent years has led to a search for new methods of milling rice in which the bran coat could be removed without the loss of any substantial portion of the endosperm. Obviously, if a device or method could be created to achieve this desideratum, yields of milled white rice could be increased significantly, resulting in large savings and more efficient production of rice.

Accordingly, it is a primary object of this invention to provide a new and improved apparatus and method for hulling and debranning cereal grains, and particularly rice, by the use of a high velocity air stream at or near the speed of sound that achieves minimum breakage and maximum husk and bran removal.

Another object of this invention is to provide a new and improved apparatus and method for hulling and debranning cereal grains that uses a toroidal-shaped chamber in which an air stream is introduced substantially tangent to the outer circumference of the chamber at or near the speed of sound to provide milling of the grains by the combined effects of agitation among the grains, air friction against the grains, and sonic vibrations acting on the grains.

Another object of this invention is to provide a new and improved milling chamber having a toroidal configuration in which cereal grains are milled by the action of a high velocity air jet introduced substantially tangent to the outer radius of the chamber and in which the grains are subjected only to glancing or tangential contact with the walls of the chamber thereby avoiding direct impact and consequent breakage of the grains.

A further object of this invention is to provide a new and improved apparatus and method for milling cereal grains using a high speed air jet at or near the speed of sound to generate sound waves in the chamber and rupture the husks and bran coats of the grains by achieving oscillations or pulsations between subsonic and supersonic velocities within the chamber.

Among the still further objects of this invention are to provide a new and improved chamber for milling cereal grains that:

(1) Comprises a continuous flow vessel in which a high velocity air jet at or near Mach one is introduced tangent to the outer radius of the vessel to impart to the grains agitation or turbulence and exposure to air friction and sonic vibrations;

(2) Avoids any abrupt changes in the flow path of the grains;

(3) Permits attainment of maximum air and grain velocity within a short period of time; and (4) Subjects the grains to continuous sonic vibrations and intense frictional forces to yield rapid and efficient sonic milling of the grains.

It is another object of this invention to achieve a new and improved sonic milling chamber for cereal grains having a configuration that permits reinforcing boosts of energy to be imparted to the grains from an air nozzle during the milling cycle.

It is a further object of this invention to provide a new and improved apparatus and method for hulling and debranning cereal grains that automatically compensates for variation of physical properties among the various types and crops of grain and substantially eliminates the effects of such variations on milling results.

Among the still further objects of this invention are to provide an apparatus and method for milling cereal grains, and particularly rice grains, that permits the ready removal of the embryo or germ of the grains and causes a smooth and gradual build-up of heat in the grains during the milling process.

Additional objects and advantages of this invention will be set forth in part in the description that follows, and in part will be obvious from the description, or may be learned by practice of the invention, the objects and advantages being realized and attained by means of the devices, apparatuses, methods and processes, particularly pointed out in the appended claims.

To achieve the foregoing objects and in accordance with its purpose, this invention as embodied and broadly described includes apparatus for hulling and debranning cereal grains comprising a housing defining a toroidal chamber and having a convergent nozzle forming an air inlet for the chamber.

The chamber has an axis, an outer circumferential boundary and an inner circumferential boundary, and the nozzle is located adjacent to the outer circumferential boundary and positioned to introduce a high velocity air stream at or near the speed of sound into the chamber substantially tangent to its outer circumferential boundary and substantially perpendicular to its axis.

The apparatus also includes a grain inlet for introducing grains to be hulled or debranned into the chamber, a grain inlet closure means for selectively opening and closing the grain inlet, a grain outlet for removing hulled or debranned grain and chaff from the chamber, a grain outlet closure means for selectively opening and closing the grain outlet, and an air outlet to permit escape of the air from within the chamber.

Finally, the practical use of this invention presupposes a supply of air under pressure and means for conducting such compressed or pressurized air from the supply to the nozzle at a pressure sufficient in combination with the configuration of the convergent nozzle to create within the chamber a high velocity air stream at or near the speed of sound.

The invention is not limited to a convergent nozzle for the toroidal chamber but also includes within its scope a convergent-divergent nozzle.

In a preferred embodiment of the invention the grain inlet is located upstream from the air inlet and adjacent the *inner* circumferential boundary of the chamber; and the grain outlet is located adjacent the *outer* circumferential boundary of the chamber.

The apparatus of this invention also preferably includes a cycling means for selectively and independently opening and closing both the grain inlet and grain outlet closure means to provide for selective introduction and removal of grains into and from the chamber.

As preferably embodied, and in accordance with the invention, the air outlet of the chamber comprises a plurality of openings adjacent its inner circumferential boundary. Further in accordance with the invention, the air inlet to the apparatus may comprise a plurality of convergent nozzles spaced around the outer circumferential boundary of the chamber, particularly when the diameter of the toroid is large.

The invention may also be described as including an apparatus for hulling and debranning cereal grain comprising a housing defining a toroidal chamber and having a convergent air nozzle forming an inlet for air under pressure.

The chamber has an axis, an outer circumferential boundary described by its outer radius, and an inner circumferential boundary described by its inner radius; the nozzle is located adjacent the outer circumferential boundary and positioned to introduce a high velocity air stream into the chamber at or near the speed of sound in a direction substantially tangent to its outer circumferential boundary and substantially perpendicular to its axis.

The apparatus also includes a grain inlet located upstream from the air inlet and adjacent the inner circumferential boundary, a grain outlet adjacent the outer circumferential boundary, a first door for the grain inlet to permit selective opening and closing of the grain inlet, and a second door for the grain outlet to permit selective opening and closing of the grain outlet.

An air outlet permits escape of the air from the chamber, and the apparatus includes a supply of air under pressure and means for conducting this air from the supply to the nozzle.

In accordance with its purpose, this invention also includes a method of hulling and debranning cereal grains comprising the steps of introducing the grains into a toroidal chamber having a convergent nozzle forming an air inlet to admit a high velocity air stream at or near Mach one in a direction substantially tangent to the outer radius of the toroidal chamber, subjecting the grains to the air stream to impart centrifugal force to the grains and induce continuous revolutions of the grains around the outer periphery of the chamber, and continuously admitting the high velocity air stream into the chamber to impart a boost of energy to the grains during each revolution about the chamber.

By this method the hulls and bran coats of the grains are ruptured and peeled away from the endosperm to achieve milling by the combined action of mutual agitation of the grains against one another and against the chamber walls, air friction against the grain surfaces, and sonic vibrations on the grain surfaces.

One embodiment of the method of hulling and debranning cereal grains comprises the steps of introducing the grains into a toroidal chamber having a convergent nozzle forming an air inlet to admit a high velocity air stream in a direction substantially tangent to the outer circumferential boundary of the toroidal chamber, subjecting the grains to the air stream to product a continuous rotary flow of grains around the chamber, and imparting a boost of energy to the grains from the high velocity air stream during each revolution, by continuously admitting the high velocity air stream into the chamber.

This method also comprises the further steps of supplying air to the nozzle entrance at a pressure of from 15 to 40 p.s.i.g., preferably 20 p.s.i.g., to create a pressure of from 3.5 to 6 p.s.i.g. in the nozzle throat and by means of such pressures and the nozzle configuration inducing a speed at or near Mach one in the air stream emitting from the nozzle exit into the chamber, agitating the grains in the air stream throughout their revolutions around the chamber to create frictional forces among the grains themselves and against the walls of the chamber, and exposing the grains in the air stream to induce air friction against and sonic vibrations on the surfaces of the grains, whereby the hulls and bran coats are ruptured and peeled away from the endosperm of the grains to achieve rapid and efficient grain milling.

In accordance with the invention, the method may also include the steps of removing the husks of the grains, retaining the husks in the chamber, and abrading the bran coat of the whole grains with the loose husks to achieve abrasive action and efficient removal of the bran coat.

The invention consists in the novel parts, constructions, arrangements, combinations, and improvements shown and described.

The accompanying drawings which are incorporated in and constitute a part of this specification illustrate one embodiment of the invention and together with the description, serve to explain the principles of the invention.

Of the drawings:

FIG. 1 is a front elevation view of the milling apparatus incorporating one embodiment of this invention and comprising a toroidal-shaped chamber shown partially in section; in the embodiment illustrated the air inlet is near the bottom of the chamber and the direction of air flow around the chamber is clockwise;

FIG. 2 is an end view of the milling apparatus shown in FIG. 1 also showing the apparatus partially in section;

FIG. 3 is a detailed sectional view showing the configuration of the nozzle forming the air inlet for the milling chamber;

FIG. 4 is a view of an alternative embodiment of the present invention incorporating two air inlets, one near the bottom of the milling chamber and one near the top; and FIG. 5 is a schematic drawing depicting the cycling sequence for the milling apparatus of this invention.

It is to be understood that both the foregoing general description and the following detailed description are exemplary and explanatory, but are not restrictive of the invention.

Reference will now be made in detail to the present preferred embodiment of the invention, an example of which is illustrated in the accompanying drawings.

In accordance with the invention, the sonic milling apparatus as shown in FIGS. 1 and 2, includes a housing 10 defining a toroidal chamber 12 having an axis 14 and an inner circumferential boundary 16 described by its inner radius and an outer circumferential boundary 18 described by its outer radius. The housing 10 includes a convergent nozzle 20 forming an air inlet 21 (FIG. 3) for the chamber 12. The nozzle 20 includes a mouth 22 (FIG. 3) into which air is introduced under pressure and a throat 24 through which the pressurized air is admitted to the chamber 12 in the form of a high velocity air jet.

In accordance with the invention and as shown in FIGS. 1 and 2, the nozzle 20 is located adjacent the outer circumferential boundary 18 and positioned to introduce an air stream into the chamber 12 substantially tangent to the outer circumferential boundary 18 and substantially perpendicular to the axis 14.

A grain inlet 26 is provided in the chamber 12 for introducing cereal grains to be hulled or debranned into the chamber 12. The grain inlet 26 is provided with a closure means 28 by which it can be selectively opened and closed. The apparatus also includes a grain outlet 30, which as here embodied, is located near the top of the chamber 12 and adjacent and substantially tangent to the outer circumferential boundary 18. Similarly to the grain inlet 26, the grain outlet 30 is provided with a grain outlet closure means 32 by which the grain outlet 30 can be selectively opened and closed.

In accordance with the invention, the housing 10 includes a series of small openings or air outlets 34 adjacent the inner circumferential boundary 16. These air outlets 34 serve as air exhaust or escape holes for the pressurized air introduced into the chamber 12 through the nozzle 20. The apparatus also includes a supply of air under pressure (not shown) and means for conducting pressurized air from the supply to the nozzle.

Although the attitude of the apparatus illustrated in the drawings, with the axis 14 of the toroid parallel to the ground and the nozzle 20 located so that it introduces the air stream into the toroidal chamber 12 adjacent to and substantially parallel to the ground, is the preferred attitude for the apparatus, it is not restricted to a particular position or attitude and will work satisfactorily in any position.

As embodied, the apparatus is supplied with a grain inlet tube 36 (FIGS. 1 and 2), and a hopper 38 by which grains, either in an unhusked condition or with only their bran coats on, may be stored and fed into the grain inlet tube 36. Similarly, the grain outlet 30 is provided with a grain outlet tube 40 which serves as a means for transporting hulled or milled grain and chaff away from the toroidal chamber 12 upon completion of milling.

An alternative embodiment of the present invention is illustrated in FIG. 4. This alternative embodiment includes two convergent nozzles 20, 29', and two air inlets 21, 21'. One air inlet 21 is located adjacent the bottom of the chamber 12 as shown in FIG. 4, and the other air inlet 21' is located near its top. An embodiment in which more than one nozzle and air inlet are used is particularly advantageous when the diameter of the housing 10 and the volume of the toroidal chamber 12 are large.

In operation, the air supply is turned on and air under pressure is introduced to the nozzle 20 via air supply line 42. The nozzle 20, as shown in FIG. 3, is a convergent nozzle and is specifically designed to yield an exit velocity emitting from its throat 24 at or near the speed of sound (Mach one), when provided with a given entrance pressure at the mouth of the nozzle 22.

In accordance with the invention, air pressure of from 15 to 40 p.s.i.g., preferably 20 p.s.i.g., when coupled with a convergent nozzle having a design pressure to match the entrance pressure of the air, can efficiently yield air velocities in the chamber 12 at or near Mach one. In achieving such velocities at the chamber air inlet 21, the pressure in the nozzle throat 24 may vary from 3.5 to about 6 p.s.i.g.

An escape path for the air introduced into the chamber 12 is furnished by the series of air outlets 34. In accordance with the invention, the air outlets 34 should provide a total exit area sufficient in size to prevent any substantial back pressure from developing in the chamber that might slow down or act as a brake on the entering air stream.

Although the desirable ratio of total air exit area to total air inlet area may vary somewhat according to the configuration of the nozzle and the amount of air pressure furnished at the nozzle mouth, an air inlet to exit area ratio of from 1:1 to 1:2 is desirable and a ratio of about 1:1.3 has been found particularly advantageous in practice.

After the air supply has been turned on and a high velocity air stream is admitted to the chamber 12 at or near Mach one, the grain inlet closure means 28 is opened by sliding it up (FIG. 1) thereby allowing the gravity feed from the hopper 38 to introduce a charge of cereal grains into the chamber 12 via the grain inlet tube 36.

Although in the present embodiment gravity can be relied upon to introduce the grains into the chamber 12, a positive feed is ensured in accordance with the invention by suction created at the mouth of the grain inlet 26 by the differential pressure between the air inlet 21 and the grain inlet 26 caused in turn by the high velocity air stream introduced at the air inlet 21. This suction force is, of course, operative to deliver the grains into the chamber 12 regardless of whether or not a gravity feed is also employed.

Once the chamber 12 has been supplied with a charge of grains, the high velocity air stream entering the chamber through the air inlet 21 at or near the speed of sound catches the grains and causes them to be accelerated to a speed near that of the air stream and to be carried around the toroidal chamber by the axial force exerted by the air stream.

In accordance with the invention, the air stream is preferably introduced substantially tangent to the outer circumferential boundary 18 of the toroidal chamber 12. This tangential direction of flow reduces breakage of grains by avoiding head-on impact of the grains against the walls of the chamber and by promoting a tangential, relatively gentle or brushing contact of the grains against the chamber walls which aids in the milling process by helping to rub away the husks or bran coats by friction against the chamber walls but prevents the hard impact that has lead to high degrees of breakage in most prior devices and methods.

Milling of the cereal grains is effected by exposing them in the toroidal chamber 12 to a large number of revolutions about the chamber within an extremely brief span of time. When it is remembered that the air stream is moving at or near Mach one, it can be appreciated that a large number of revolutions will be made around the toroidal chamber for each second of time that the grains reside in the chamber. On the other hand, of course, the larger the diameter of the chamber the smaller will be the number of revolutions.

Good milling results are obtained with chambers of about three (3) feet or more in mean diameter. But, as taught in this invention, when larger-sized chambers are used, it has been found beneficial to include more than one air stream for the chamber. FIG. 4 illustrates an emdodiment making use of this principle, in which two nozzles 20, 20' are used to deliver two high velocity air streams to the toroidal chamber 12.

Similarly, as the toroidal chambers become larger, milling efficiency may be increased by adding additional high velocity air streams, and a plurality of nozzles and air inlets may be used for this purpose judiciously spaced around and adjacent to the outer circumferential boundary 18 of the milling chamber 12. When more than one air stream is employed, the grain revolving in the mill chamber 20 is given a boost of energy from each air stream as it revolves around the chamber.

It is also an important advantage of the toroidal-shaped chamber of this invention over prior milling chambers that the grains are subjected to at least one reinforcing boost of energy each time they complete a revolution of the chamber. The grains are thus kept at or near the velocity of Mach one throughout their entire residence in the chamber and their maximum velocity is quickly reached upon their introduction into the chamber.

Milling of the grains is accomplished by at least three important factors made possible by the use of the toroidal-shaped chamber. These are:

(1) *agitation* of the grains against one another and against the walls of the chamber to produce rapid milling by mechanical friction, (2) *air friction* induced by the action of the air stream passing over the grains tending to wear away and peel off the hulls and bran coats, and (3) *sonic vibrations* induced on the surfaces of the grains at the points where air achieves the velocity of sound in passing over the grains.

All three factors supplement and reinforce each other in contributing to rapid and efficient milling to produce a high yield of a high quality end product.

The apparatus and method of the invention are particularly efficacious in effecting removal of the germ from the ends of rice grains. In the past, germ removal has proved to be a troublesome part of rice milling, but with this invention, it is quickly and easily accomplished.

In the present invention it has also been found that milling speed and efficiency can be enhanced by introducing oscillations or pulsations into the air stream so that the stream pulsates or oscillates between velocities above and below the speed of sound. Such oscillations or pulsations tend to increase the action of the sonic vibrations in effecting milling of the cereal grains.

Also in accordance with the invention, although there is a slight build-up of heat during the actual milling of the grain, which, with rice, for example, may last from 5 to 20 seconds depending upon the size of the chamber and velocity of the air stream, this build-up is smooth in gradient and does not reach the proportions that cause cracking and checking of rice grains and make them fragile and subject to breakage.

Upon completion of milling, the grain outlet closure means 32 is opened, and the centrifugal force induced on the grains by the air stream causes them together with the chaff to be ejected through the grain outlet 30 into the grain outlet tube 40 from where they may be transported to an appropriate separating means such as a cyclone or aspirator. As here preferably embodied, the grain outlet tube 40 is adjacent to the outer circumferential boundary 18 of the chamber 12 and is substantially tangent to the outer radius of the chamber so that impact of the grains against the walls of the grain outlet tube 40 is kept to a minimum.

A typical cycle of operation is illustrated by the diagrammatic time sequence line of FIG. 5. As shown in in FIG. 5, the grain inlet 30 opens for a discrete interval of time during which grain is charged to the chamber 12. The grain inlet is then closed while milling takes place, although some milling may take place while the grain inlet is open and charging grain to the chamber.

This initial milling is possible because the centrifugal force induced on the grains by the air stream causes them to circle the chamber adjacent to or in contact with the outer circumferential wall. The grains that are being milled in the chamber thus do not interfere with grains being charged to the chamber through the open grain linet 26 (FIG. 1).

As shown in FIG. 5, and in accordance with the invention, the grain inlet and outlet remain closed for a second discrete interval of time during which milling principally takes place. When milling is complete, which may be a matter of only a few seconds, the grain outlet 30 is opened by sliding the grain closure means 32 in a clockwise direction, as shown in FIG. 1, and the grain outlet 30 remains open for a discrete interval of time during which the charge of milled grain and chaff is essentially completely removed from the chamber. When the grain outlet 30 is closed, the grain inlet 26 opens again to admit a new charge of grain to be milled, and the cycle is then repeated (FIG. 5).

It is also within the concept of the present invention, to provide automatic cycling means that will automatically open and close the grain outlet 26 and grain inlet 30 at the proper times during each milling cycle, as determined by particular nozzle configurations and milling chamber shapes and sizes.

It is not essential that the milling chamber embody the shape of a perfect toroid, but its shape may vary from a perfect toroid within reasonable limits so long as the principle of a smooth gently curving continuous milling path is maintained.

The apparatus and method of this invention have been found particularly excellent for the debranning of rice grains. Milling of brown rice to remove its bran coat and obtain the polished white rice of commerce as an end product has been an especially troublesome problem in the rice industry for many years. Moreover, apparatuses and methods in use today are essentially refinements on basic methods and apparatus that have been used for hundreds of years.

Such apparatuses and methods remove the bran coat by subjecting it to the rubbing or scrubbing action of mechanical means, such as millstones. When carried out to a sufficient degree, the bran coat is completely worn away in this manner. In the attrition required to remove the last vestiges of the bran covering, however, a good deal of the valuable endosperm or white kernel is also abraded and milled away. Consequently, not only is the bran coat removed but also a substantial portion of the valuable endosperm, and the yield of white rice is correspondingly reduced.

One of the principal advantages of the present invention is that it achieves removal of the bran coat on rice grains primarily by air friction and sonic vibrations which peel away the bran layer but leave the endosperm intact. Although there is some friction of grains against grains and against the walls of the milling chamber, such friction is not severe and does not cause a loss of endosperm comparable to that encountered in the conventional milling process. Accordingly, the apparatus and method of this invention makes it possible to achieve maximum bran removal with minimum breakage and loss in yield from abrasion of the endosperm.

In operation, this invention may be used to mill paddy rice into white rice if carried to completion, or may alternatively be used to convert brown rice into white rice by removal of the bran coat. In milling paddy rice into white rice, the husk is first removed and the rice husks themselves serve as an excellent abrasive agent to accelerate bran coat removal.

The rice husks themselves are close to an ideal abrasive, since they introduce no foreign matter into the rice and may be easily removed or separated from the milled product by means of a cyclone, aspirator or similar device upon completion of milling.

When it is desired to mill brown rice into white rice by the apparatus and method of this invention, it is desirable to include a proportion of rice hulls in the grain charged to the milling chamber so that these husks may serve as an abrasive to enhance efficient removal of the bran coats.

It is also within the scope of this invention to include other forms of abrasives either with paddy rice or brown rice to improve milling efficiency. Various ground plastics, such as acrylic, have been found effective for this purpose.

This invention also includes within its ambit the use of a convergent-divergent or C-D nozzle in which the first or upstream section of the nozzle converges toward the nozzle throat and the second or downstream section of the nozzle diverges from the throat toward the air inlet. The use of such a nozzle enables the attainment of air stream speeds well in excess of Mach one, such as for example, a speed of Mach 1.6.

In accordance with the invention, however, it has been discovered that best results are obtained when the speed of the air stream entering the chamber is at or near a velocity of Mach one, or when it pulsates or oscillates between speeds slightly above and slightly below Mach one. Air stream speeds much below Mach one tend to result in too slow milling, whereas speeds much above Mach one tend to cause excessive breakage.

The invention in its broader aspects is not limited to the specific mechanisms and methods shown and described, but also includes within the scope of the accompanying claims any departures made from such mechanisms and methods which do not depart from the principles of the invention and which do not sacrifice its chief advantages.

What is claimed is:

1. Apparatus for hulling and debranning cereal grains comprising a housing defining a toroidal chamber of substantially uniform cross-sectional area and having a convergent nozzle forming an air inlet for the chamber, the chamber having an axis, an outer circumferential boundary, and an inner circumferential boundary, the nozzle being located adjacent the outer circumferential boundary and disposed to introduce an air stream into the chamber at or near the speed of sound substantially tangent to its outer circumferential boundary and substantially perpendicular to its axis, a grain inlet in the chamber for introducing grains to be hulled or debranned into the chamber, a grain inlet closure means for opening and closing the grain inlet, a grain outlet for removing hulled or debranned grain from the chamber, a grain outlet closure means for opening and closing the grain outlet, an air outlet to permit escape of air from the chamber, a supply of air under pressure, and means for conducting air under pressure from the supply to the nozzle.

2. The invention as defined in claim 1, in which the grain inlet is located in the toroidal chamber upstream from the air inlet in an area of the chamber having a pressure lower than that adjacent and immediately downstream from the air inlet whereby grains are drawn into the chamber from the grain inlet by suction created by differential pressure.

3. The invention as defined in claim 2, in which the grain inlet is located upstream from the air inlet and adjacent the inner circumferential boundary of the chamber, and the grain outlet is located adjacent the outer circumferential boundary of the chamber.

4. The invention as defined in claim 1, in which the apparatus has a plurality of air outlets provided in the inner circumferential boundary of the chamber.

5. The invention as defined in claim 1, in which the housing includes a second convergent nozzle forming a second air inlet for the chamber located adjacent the outer circumferential boundary disposed to introduce an air stream into the chamber substantially tangent to its outer circumferential boundary.

6. The invention as defined in claim 1, which includes a plurality of convergent nozzles forming a plurality of air inlets for the chamber.

7. Apparatus for hulling and debranning cereal grains comprising a housing defining a toroidal chamber of substantially uniform cross-sectional area and having a convergent air nozzle forming an inlet in the chamber for air under pressure, the chamber having an axis, an outer circumferential boundary described by its outer radius, and an inner circumferential boundary described by its inner radius, the nozzle being located adjacent the outer circumferential boundary and positioned to introduce an air stream into the chamber at or near the speed of sound in a direction substantially tangent to its outer circumferential boundary, a grain inlet located upstream from the air inlet nozzle and adjacent the inner circumferential boundary of the chamber, a grain inlet closure means for opening and closing the grain inlet, a grain outlet located adjacent the outer circumferential boundary, a grain outlet closure means for opening and closing the grain outlet, an air outlet to permit escape of air from the chamber, a supply of air under pressure, and means for conducting air under pressure from the supply to the nozzle.

8. The invention as defined in claim 7, in which the axis is substantially parallel to the ground.

9. The invention as defined in claim 8, in which the air stream is introduced into the chamber substantially parallel to and adjacent to the ground.

10. The method of hulling and debranning cereal grains comprising the steps of introducing the grains into a toroidal milling chamber, confining the grains in a torodial path within the chamber, admitting a high velocity air stream at or near Mach one into the chamber in a direction substantially tangent to the outer radius of the toroidal path, subjecting the grains to the air stream to impart centrifugal force to the grains and induce continuous revolutions of the grains around the outer periphery of the chamber, and continuously admitting the high velocity air stream into the chamber to impart a boost of energy to the grains during each revolution about the chamber and to maintain the velocity of the air stream to which the grains are subjected at or near Mach one, whereby the hulls and bran coats of the grains are ruptured and peeled away from the endosperm to achieve milling by the combined action of mutual agitation of the grains against one another and against the chamber walls, and air friction against and sonic vibrations on the grain surfaces.

11. The invention as defined in claim 10, which includes the steps of admitting a plurality of high velocity air streams at or near Mach one into the toroidal chamber in a direction substantially tangent to the outer radius of the toroidal path, subjecting the grains to the air streams to produce centrifugal forces on the grains and a continuous revolution of the grains around the chamber, and imparting a boost of energy to the grains from each high velocity air stream during each revolution of the grains around the chamber.

12. The invention as defined in claim 10, which includes the steps of intermittently admitting the grains into the toroidal chamber upstream of the air inlet, and intermittently withdrawing milled grains from the chamber adjacent its outer circumferential boundary.

13. The invention as defined in claim 10, which also includes the steps of removing the husks of the grains, retaining the husks in the chamber, and abrading the bran coat of the hulled grains with the loose husks to achieve abrasive action inducing efficient removal of the bran coat.

References Cited by the Examiner

UNITED STATES PATENTS

| | | | |
|---|---|---|---|
| 493,509 | 3/1893 | Menge | 146—221.6 |
| 2,325,080 | 7/1943 | Stephanoff | 241—5 |
| 2,620,841 | 12/1952 | Jacobson | 146—221.7 |

WILLIAM W. DYER, Jr., *Primary Examiner.*

W. GRAYDON ABERCROMBIE, *Examiner.*